United States Patent [19]

Stahl

[11] Patent Number: 5,784,450
[45] Date of Patent: Jul. 21, 1998

[54] METHOD OF ESTABLISHING A CONNECTION TO A SUBSCRIBER THROUGH A FIRST NETWORK, AS WELL AS SERVICE COMPUTER, SWITCHING FACILITY, AND TERMINAL

[75] Inventor: Uwe Stahl, Leonberg, Germany

[73] Assignee: Alcatel SEL Aktiengesellschaft, Stuttgart, Germany

[21] Appl. No.: 418,067

[22] Filed: Apr. 6, 1995

[30] Foreign Application Priority Data

Apr. 8, 1994 [DE] Germany ............ 44 12 104.0

[51] Int. Cl.$^6$ ............ H04M 7/00
[52] U.S. Cl. ............ 379/233; 379/220; 379/230
[58] Field of Search ............ 379/207, 216, 379/219, 220, 221, 229, 230, 231, 232, 233

[56] References Cited

U.S. PATENT DOCUMENTS

| | | | |
|---|---|---|---|
| 5,099,511 | 3/1992 | Matsumoto | 379/233 X |
| 5,233,648 | 8/1993 | Nakamura | 379/233 |
| 5,247,571 | 9/1993 | Kay et al. | 379/230 X |
| 5,333,185 | 7/1994 | Burke et al. | 379/207 X |
| 5,369,695 | 11/1994 | Chakravarti et al. | 379/230 X |
| 5,553,130 | 9/1996 | Turner | 379/230 X |

FOREIGN PATENT DOCUMENTS 2431007  1/1976  Germany.

OTHER PUBLICATIONS

"Service 180 (Bundeseinheitliche Rufnummer:" of a book by Wilhelm [G]Krusch, Neu Dienste im Intelligenten Telefonnetz edited by RV. Decker's Verlag G. Schenk, on pp. 164–168.

Primary Examiner—Harry S. Hong
Attorney, Agent, or Firm—Ware, Fressola, Van Der Sluys & Adolphson LLP

[57] ABSTRACT

A method for the establishment of a connection from a first network to a second network. During call set-up, a part (N3) of the call number assigned to a subscriber (B) is transmitted from a first network (PUBNET) to a second network (PRNET) using a method different from that used to signal address information. In particular, the dialing of an IN service transports a part of the call number, in the area intended for the ISDN subaddress, to a private branch exchange (EX4) associated with the called subscriber (B).

20 Claims, 5 Drawing Sheets

METHOD OF ESTABLISHING A CONNECTION TO A SUBSCRIBER THROUGH A FIRST NETWORK, AS WELL AS SERVICE COMPUTER, SWITCHING FACILITY, AND TERMINAL

TECHNICAL FIELD

The present invention relates to a method of establishing a connection to a subscriber through a first network. It also relates to a service computer for connection to a first network, to a switching facility for a second network, and to a terminal for connection to a network.

BACKGROUND OF THE INVENTION

In most countries, two different network types have developed in the course of time, namely a public telecommunication network (e.g., telephone network, ISDN) and a considerable number of private or special networks.

A private network generally consists of one or more private branch exchanges to which a plurality of telephone sets are connected and which have at least one connection to the public network. Private networks often provide communications service for business organizations or public authorities. Furthermore, private networks of private network operators, which consist of two or more intermeshed exchanges, are gaining a greater market share.

To establish a connection from a subscriber of the public network to a subscriber of a private network, the subscriber of the public network generally dials a DID (direct-inward-dialing) number, which consists of a first part and a second part. The first part, the code of the private branch exchange, selects a gateway from the public network to the private network. The second part, also called "subscriber number", represents the subscriber's number in the numbering area of the private network. A request to establish such a connection thus contains a number whose first part and second part are evaluated by the public network and the private network, respectively.

The invention assumes that a connection is to be established from the public network to a private network by means of a service which translates call numbers. Such a service is, for example, the so-called Service 180 of the German Bundespost, which is described in Chapter 5.2.3.3, "Service 180 (Bundeseinheitliche Rufnummer)", of a book by Wilhelm Grusch, "Neue Dienste im Intelligenten Telefonnetz", edited by RV. Decker's Verlag G. Schenk, on pages 164–168. This service makes a universal access number available to business organizations or public authorities, for example. To establish a connection to a business organization with such a number, the service is first dialled. The service receives the call request, extracts the call number therefrom, and translates it. Then it routes the call to this translated number. The translated numbers may also be numbers of different private networks connected to the public network. Thus, employees of a business organization who are connected to the public network via different, spatially separated private networks can be reached at a single number.

With increasing size of the private networks, the problem arises that the number of digits in a DID number which are available for the subscriber numbers is no longer sufficient. The internationally standardized maximum number of digits in a call number is currently 12, and will be 15 as of Jan. 1, 1997. For ISDN (=integrated services digital network), for example, this has been fixed in CCITT Recommendation E.164. Since a major part of these digits is used for the selection of the gateway to the private network, only a small part remains for the subscriber number. These problems also arise with the above connection set-up by means of Service 180.

SUMMARY OF THE INVENTION

It is therefore the object of the invention to permit the establishment of a connection from a first network to a second network which has a major address space.

The fundamental idea of the invention is to transmit, during the establishment of a connection to a subscriber, a part of the number assigned to the subscriber from the first network to the second network by a method different from that used to signal address information.

This offers the advantage that the number of call-number digits usable for the second network is increased.

By "call number" is to be understood not only a code designating a subscriber station, but also a code identifying a subscriber.

According to an advantageous aspect of the invention, a service of the first network can be dialed which transmits part of the call number to a switching facility of the second network by a method different from that used to signal address information. This makes it possible to use more than 15 digits for signaling between the service and the called subscriber. An increase in the supply of call numbers follows from the fact that the call number of the service and the code for the second network together are, as a rule, shorter than the code of the gateway, or that the service can request further information from the calling subscriber. The call number of the service and the code for the second network are shorter particularly if calls to the second network pass through further networks.

Another advantage results if there are two or more gateways to the second network. For each of these gateways, a code would have to be made available in the public network with a certain number of digits for the subscriber number. The number of these digits determines the possible address space in the private network. In the present invention, only one code per gateway and one call number for the service with a number of digits corresponding to the address space are needed. Thus, particularly with a great number of gateways to the second network or a great number of subscribers in the second network, considerable savings are achieved with respect to the supply of call numbers in the first network.

A further advantage results for second networks, such as mobile-radio networks, in which the subscriber can be reached via one of a plurality of subscriber interfaces. To establish a connection to the subscriber, these networks need the subscriber's identity code, which generally consists of a major number of digits and is thus difficult to transport in the call request. The invention provides a solution to this problem.

BRIEF DESCRIPTION OF THE DRAWINGS

The invention will become more apparent from the following description of three embodiments taken in conjunction with the accompanying drawings, in which.

BEST MODE FOR CARRYING OUT THE INVENTION

The first embodiment illustrates the use of the novel method in a communication arrangement consisting of a private network and a public network, the public network having a service computer according to the invention associated with it, and the private network containing a switching facility according to the invention.

It is also possible to carry out the method according to the invention in any other communication arrangement consisting of at least two communication networks. In view of the growing number of private network and service providers, such communication arrangements are likely to gain significance.

In such a communication arrangement, a subscriber of a first or any other network would dial a service of the first network, and this service would route the call to a switching facility of a second network by the method according to the invention. The switching facility would then route the call to a subscriber of the second or any other network. Between the first and second networks, the call would be routed through an arbitrary number of other networks.

Figure 1:
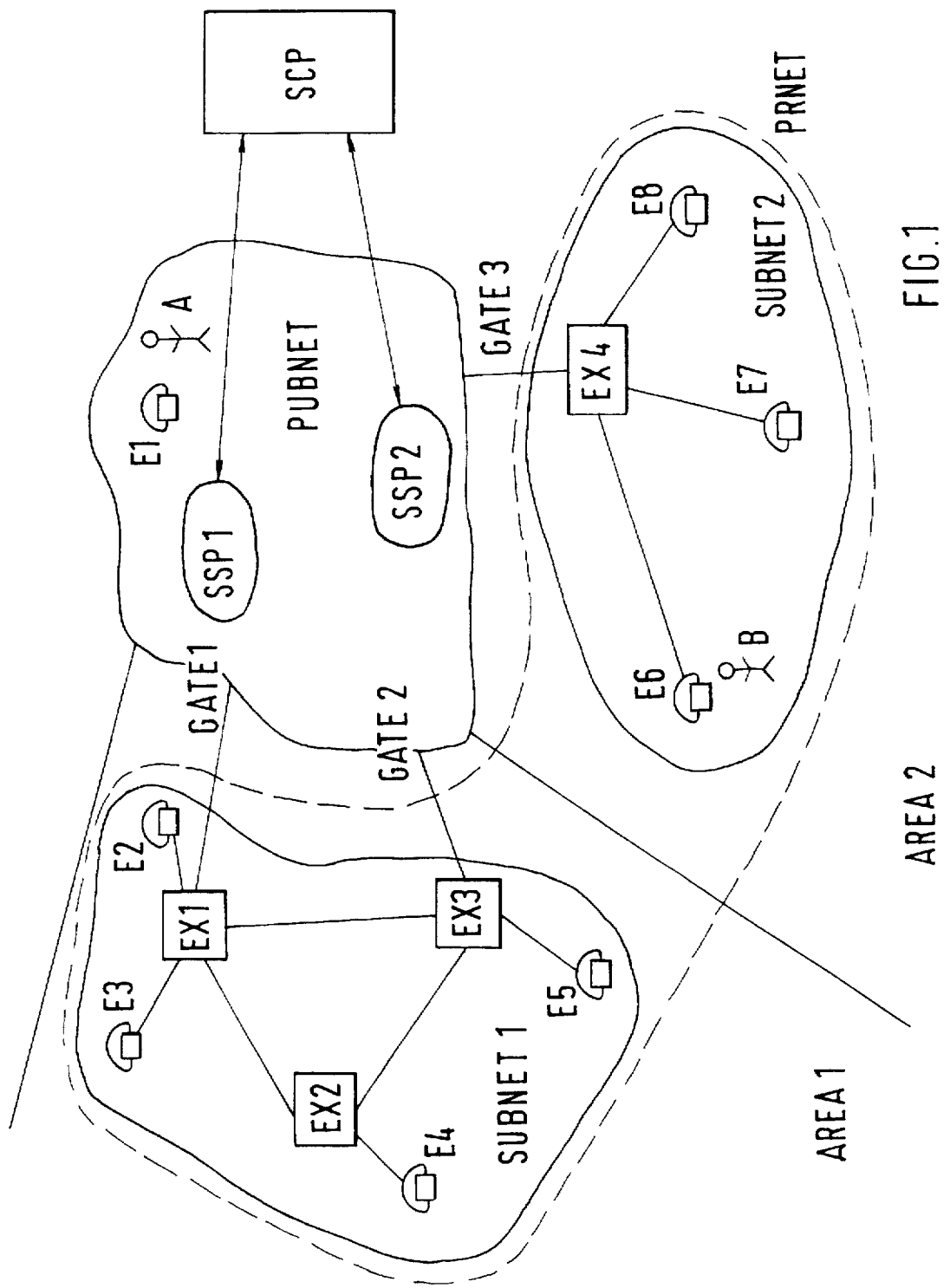
FIG. 1 is a symbolic representation of a communication arrangement with a service computer according to the invention and several switching facilities according to the invention for a first embodiment.

FIG. 1 shows a public network PUBNET, a private network PRNET, and a service computer SCP.

The private network PRNET represents the network of a business organization which has branch offices at two different locations. The private network PRNET thus consists of two spatially separated subnetworks SUBNET1 and SUBNET2, with the subnetwork SUBNET1 located in an area AREA1, and the subnetwork SUBNET2 in an area AREA2. The subnetwork SUBNET1 is connected to the public network PUBNET via two gateways GATE1 and GATE2, and the subnetwork SUBNET2 via a gateway GATE3.

It is also possible that the gateways GATE1 to GATE3 connect the public network PUBNET to the subnetworks SUBNET1, SUBNET2, and SUBNET3 not directly, but through one or more further networks. In that case, additional numbers would have to be provided for dialing through these networks. Permanent or semipermanent connections would also be possible.

The subnetwork SUBNET1 contains three switching facilities EX1 to EX3 and a plurality of terminals, of which the terminals E2 to E5 are shown. The switching facilities EX1 to EX3 are interconnected. The switching facility EX1 is connected to the public network PUBNET through the gateway GATE1, and the switching facility EX3 through the gateway GATE2. The terminals E2 and E3 are connected to the switching facility EX1; the terminal E4 is connected to the switching facility EX2, and the terminal E5 to the switching facility EX3.

The subnetwork SUBNET2 contains a switching faciality EX4 and a plurality of terminals connected to this facility, of which the terminals E6 to E8 are shown. The switching facility EX4 is connected to the public network PUBNET through the gateway GATE3.

The terminals E2 to E8 are terminals for telecommunication networks, such as telephone, fax, or a computer of suitable design. Such a terminal may also be an access to a service computer or service system (e.g., IN=Intelligent Network).

The switching facilities EX1 to EX4 are constructed like conventional private exchanges, and are thus responsible for the establishment and release of connections between the terminals connected to them, E6 to E8, and the other terminals of the private network PRNET and the public network PUBNET. Unlike conventional private branch exchanges, however, they can receive a part of the number of an incoming call in a manner other than that intended for the signaling of address information.

The public network PUBNET is formed by a public telecommunication network. It thus contains several exchanges and a plurality of terminals connected thereto. Both the public network PUBNET and the private network PRNET are, without any limitation on generality, ISDN-capable.

Of the terminals of the public network PUBNET, only one terminal E1 is shown. It is of the same design as the terminals E2 to E8.

Of the exchanges of the public network PUBNET, only two exchanges SSP1 and SSP2 are shown. The exchanges SSP1 and SSP2 differ from the other exchanges of the public network PUBNET in that they send inquiries to the service computer SCP on the occurrence of a given discrimination number. This discrimination number will henceforth be called a "service code". In response to such an inquiry, the exchanges SSP1 and SSP2 receive control information which relates to the further handling of the call request and to the transmission of messages associated with this call request. The exchanges SSP1 and SSP2, together with the service computer SCP, thus provide a service in the public network PUBNET.

The number of exchanges designed like the exchanges SSP1 and SSP2 and connected to the service computer SCP may also be different, but at least one such exchange is required.

Furthermore, the service computer SCP may be incorporated in an exchange, and the public network PUBNET may contain one or more such exchanges.

The terminals E1 and E6 are operated by a subscriber A and a subscriber B, respectively.

The establishment of a connection from a subscriber of the public network PUBNET to a subscriber of the private network PRNET will now be explained, by way of example, with reference to a call from subscriber A to subscriber B. The call establishment is illustrated in FIG. 2 in the form of a flow chart.

Figure 2:
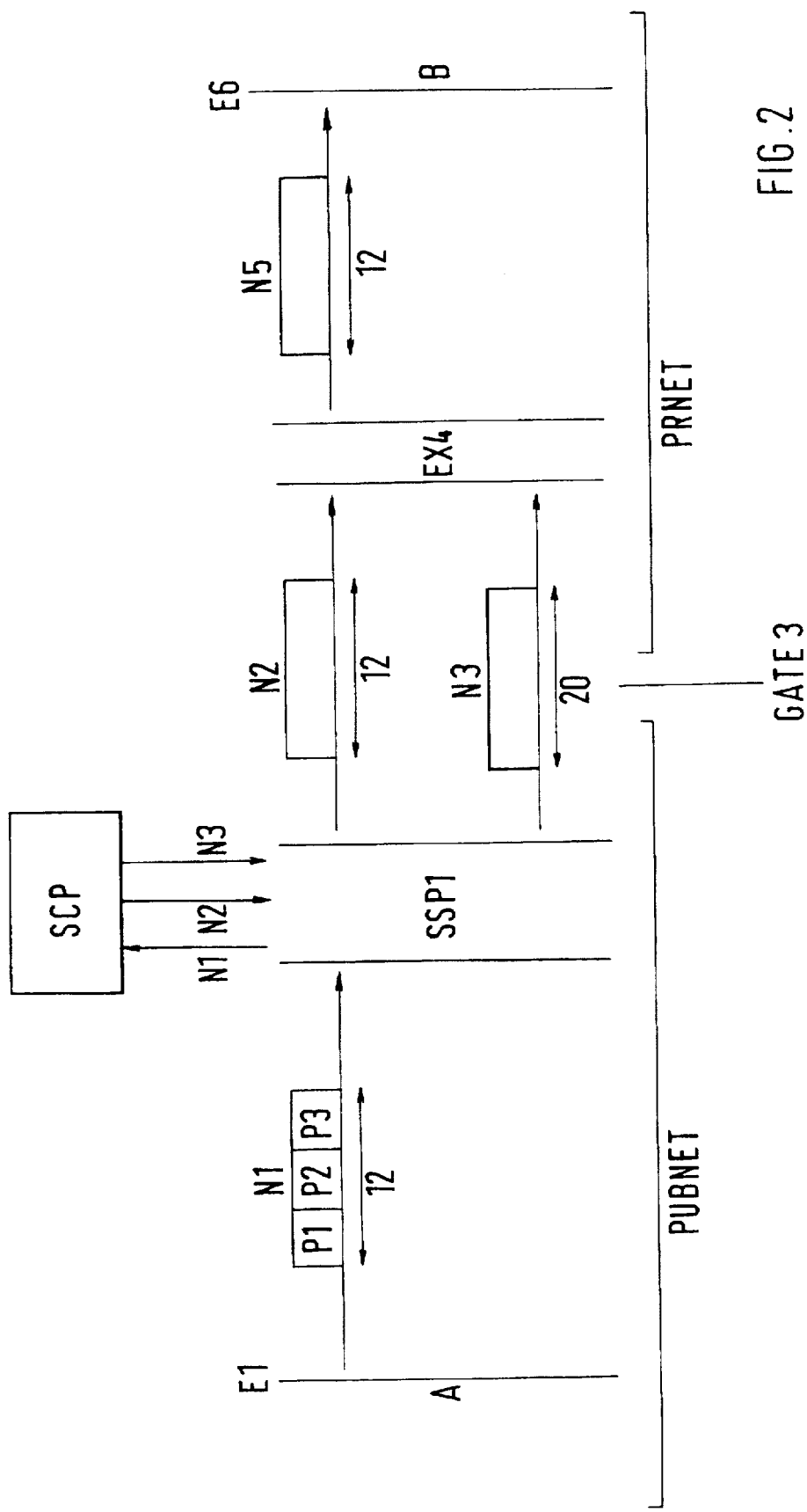
FIG. 2 is a flow chart illustrating the establishment of a connection by the method according to the invention for the first embodiment.

FIG. 2 shows the subscribers A and B, the terminals E1 and E6, the switching facility EX4, the exchange SSP1, and the service computer SCP. The call from subscriber A to subscriber B is routed to the gateway GATE3 within the public network PUBNET, and then within the private network PRNET.

Subscriber A wants to make a call to subscriber B. He sends a call request from his terminal E1 to the service which is provided by the service computer SCP and the exchanges SSP1 and SSP2. The call request contains a call number N1, which consists of three parts P1 to P3. The maximum number of digits of the number N1 is 12. Part P1 is the code of the service. Part P2 designates the private network PRNET. The third part is the number of subscriber B according to the numbering plan of the private network PRNET.

Based on the service code, which is represented by part P1, the call is now routed to one of the exchanges SSP1 or SSP2, here to exchange SSP1. When the call reaches the exchange, the latter recognizes the service code and transmits the number N1 to the service computer SCP. The service computer generates the call number of subscriber B from the number N1 and divides the call number into two parts, the numbers N2 and N3. It sends these numbers to the exchange SSP1 and causes this exchange to advance the call with the number N2 as the call number, and to enter the number N3 in the call request at the place intended for the ISDN subaddress. The maximum number of digits of the number N3 is 20. In this embodiment, the number N2 is selected by the service computer SCP so that it directs the call to the switching facility EX4.

If the call were routed through one or more further networks between the public network PUBNET and the subnetwork SUBNET2, the number N2 would consist of parts which would be responsible for dialing through the public network PUBNET and for dialing through the individual further networks into the subnetwork SUBNET 2.

It is also possible that after receipt of the number N, the service computer sends a message back to the terminal E1 and requests further numbers. These numbers are added to the number N1 by the service computer SCP to form a new number N1', which is processed like the number N1. However, this new number N1' may comprise more than 12 digits.

The switching facility EX4 extracts the number N3 from the area intended for the ISDN subaddress, and generates a number N5 from this number N3 and the number N2. The number N5 selects the subscriber B in the private network PRNET; in this embodiment, it represents the subscriber number of subscriber B according to the numbering plan of the private network PRNET. The call is then routed on to the terminal E6, which is assigned to subscriber B. Thereafter, the connection can be established.

If subscriber B were not a subscriber of the private network PRNET, but a subscriber of a further network connected via a further gateway to the subnetwork SUBNET, the number N5 would not represent a number of the numbering plan of the private network PRNET. It would represent the number for dialing from the subnetwork SUBNET1 directly to the subscriber B of the further network.

Those functions of the switching facility EX4 which are connected with the generation of the number N5 can also be performed by a service computer which is selected directly by the number N2 or a part thereof.

Figure 3:
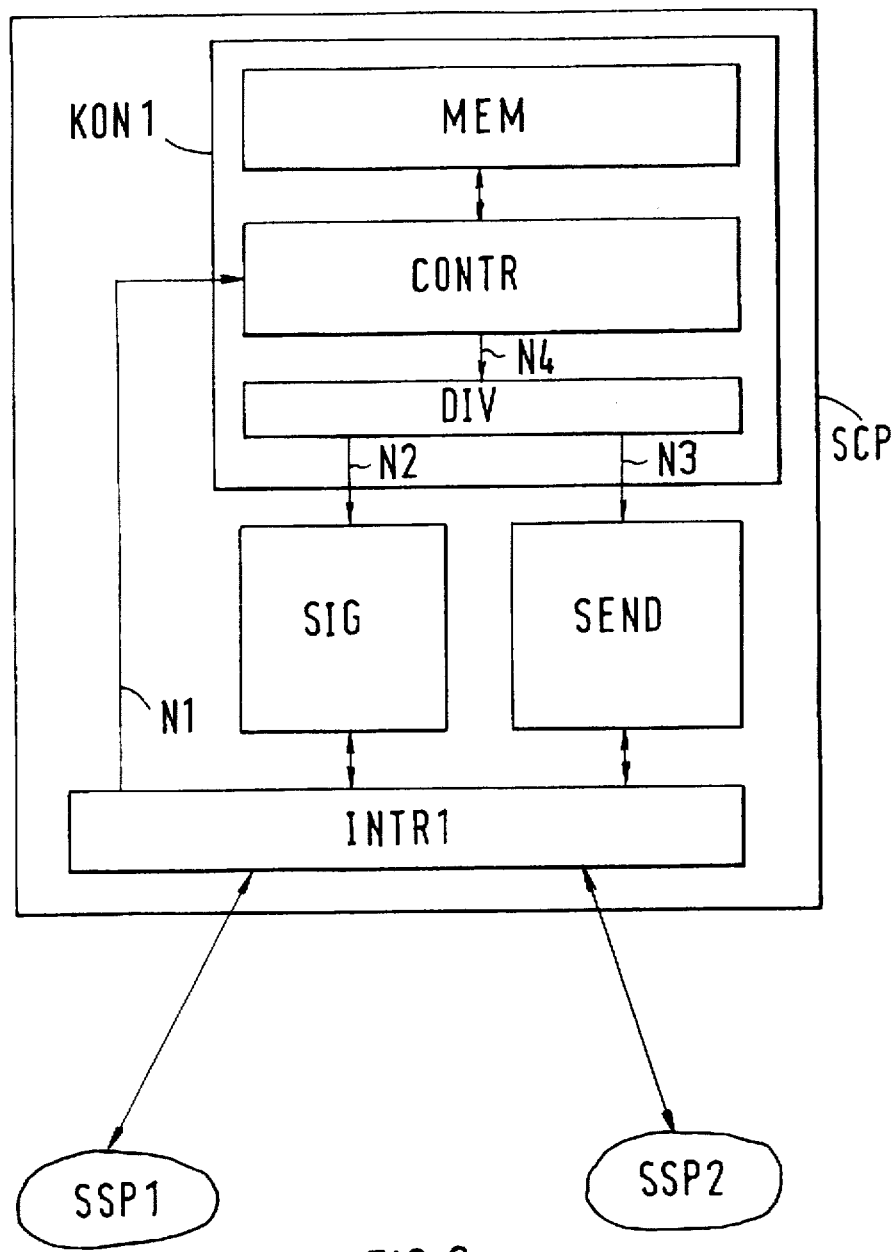
FIG. 3 is a block diagram of the service computer of FIG. 1.

The exact sequence of operations in the service computer SCP and between the service computer SCP and the exchange SSP1 will now be illustrated with the aid of FIG. 3.

FIG. 3 shows the service computer SCP and the two exchanges SSP1 and SSP2. The service computer SCP exchanges data with the exchanges SSP1 and SSP2. The service computer SCP contains a translating device KON1, a signaling device SIG, a sending device SEND, and an interface device INTR1.

The interface device INTR1 sends data to and receives data from the exchanges SSP1 and SSP2. The translating device KON1 receives the number N1 from the interface device INTR1 and sends the numbers N2 and N3 to the signaling device SIG and the sending device SEND, respectively. The signaling device SIG and the sending device SEND exchange data with the interface device INTR1.

The interface device INTR1 serves to communicate with the exchanges SSP1 and SSP2. If one of the two exchanges SSP1 and SSP2 recognizes the service code in the part P1 of the number N1, which in this case represents the number of an incoming call, it will send a request to the service computer SCP. This request contains, inter alia, the number of the called subscriber, which is contained in the call request. In this embodiment, this number is the number N1, which consists of the parts P1, P2, and P3. The interface device INTR1 now extracts the call number, i.e., the number N1, from the request and passes it to the translating device KON1. The interface device INTR1, in turn, receives control instructions from the signaling device SIG and the sending device SEND, and enables these two devices to communicate with the exchanges SSP1 and SSP2.

The signaling device SIG receives the number N2 from the translating device KON1. This causes the signaling device to instruct that of the two exchanges SSP1 and SSP2 from which the request with the number N1 came to enter the number N2 in the waiting call at the place intended for the call number. Furthermore, the signaling device causes the exchange to route the call onward in accordance with this call number, which now corresponds to the number N2.

The sending device SEND receives the number N3 from the translating device KON1. This causes the sending device SEND to send to that of the two exchanges SSP1 and SSP2 which has sent the request with the number N1 to the service computer SCP a control instruction which instructs it to enter the number N3 in the waiting call at the place intended for the ISDN subaddress. Thus, the number N3 is automatically transported with the waiting call as the latter is routed onward.

It is also possible for the sending device SEND to send out the number N3 in another manner. One possibility is to enter the number N3 in the call request at another place. Another possibility is to send the number N3 over a signaling channel to the switching facility EX4 independently of the waiting call. It is also possible for the sending device SEND to set up an information-carrying channel to the switching facility EX4 and transmit the number N3 over this channel in a suitably coded form.

The translating device KON1 contains a memory device MEM, a control device CONTR, and a dividing device DIV. The control device CONTR exchanges data with the memory device MEM and sends data on a number N4 to the dividing device DIV.

In the memory device MEM, each subscriber number of the private network PRNET is assigned the code of that of the gateways GATE1 to GATE3 via which the corresponding terminal can be reached best.

If the call passes through further networks, the memory device MEM will hold one or more numbers for dialing through these networks into the respective subnetwork. It may also contain the numbering plan of the private network PRNET and the assignment of these subscriber numbers to the subnetworks SUBNET1 and SUBNET2.

The control device CONTR receives the number N1 via the interface device INTR1. It checks with the aid of the part P2 of the number N1, which contains the identification code of the private network PRNET, whether the call is directed to a subscriber of the private network PRNET. If so, the control device CONTR reads from the memory device MEM the code of that of the gateways GATE1 to GATE3 via which the subscriber can be reached best. In this example, this is the code of the gateway GATE3. To this code, the control device CONTR adds the subscriber number to generate a number N4, which represents the call number of the subscriber.

If the call passes through one or more further networks, the number for dialing through these networks is withdrawn from the memory device. If, in that case, two or more paths, i.e., two or more through-dialing numbers, were available, the control device could select the most favorable path based on predetermined criteria, such as traffic carried, transmission quality, or call-charge aspects. Such a decision would also be possible in the case of two or more gateways, as for the subnetwork SUBNET1 in FIG. 1.

The dividing device DIV divides the call number N4 into two parts, the numbers N2 and N3. The number N2 corresponds to the code of the gateway GATE3, and the number N3 to the subscriber's number according to the numbering plan of the private network PRNET.

It is also possible that the dividing device DIV divides the call number N4 in a different manner. For example, the number N2 may contain the code of the gateway GATE3 and a part of the subscriber number. The number N3 would then contain the remainder of the call number N4.

The service computer SCP thus receives from the exchange SSP1 a request with a number N1. This number N1 includes, inter alia, an identification code of the desired private network, here the private network PRNET, and the number of the wanted subscriber according to the private numbering plan. The translating device KON1 then generates from the number N1 a number N4 which represents the number for direct inward dialing through to the private network. The number N4 thus consists of the code of the gateway GATE3 and the subscriber number of subscriber B according to the numbering plan of the private network PRNET. The translating device KON1 then divides the call number N4 into a number N2 and a number N3. The signaling device SIG enters the number N2 in the waiting call and causes the call to be routed onward. The sending device SEND sends the number N3 to the exchange EX4.

Figure 4:
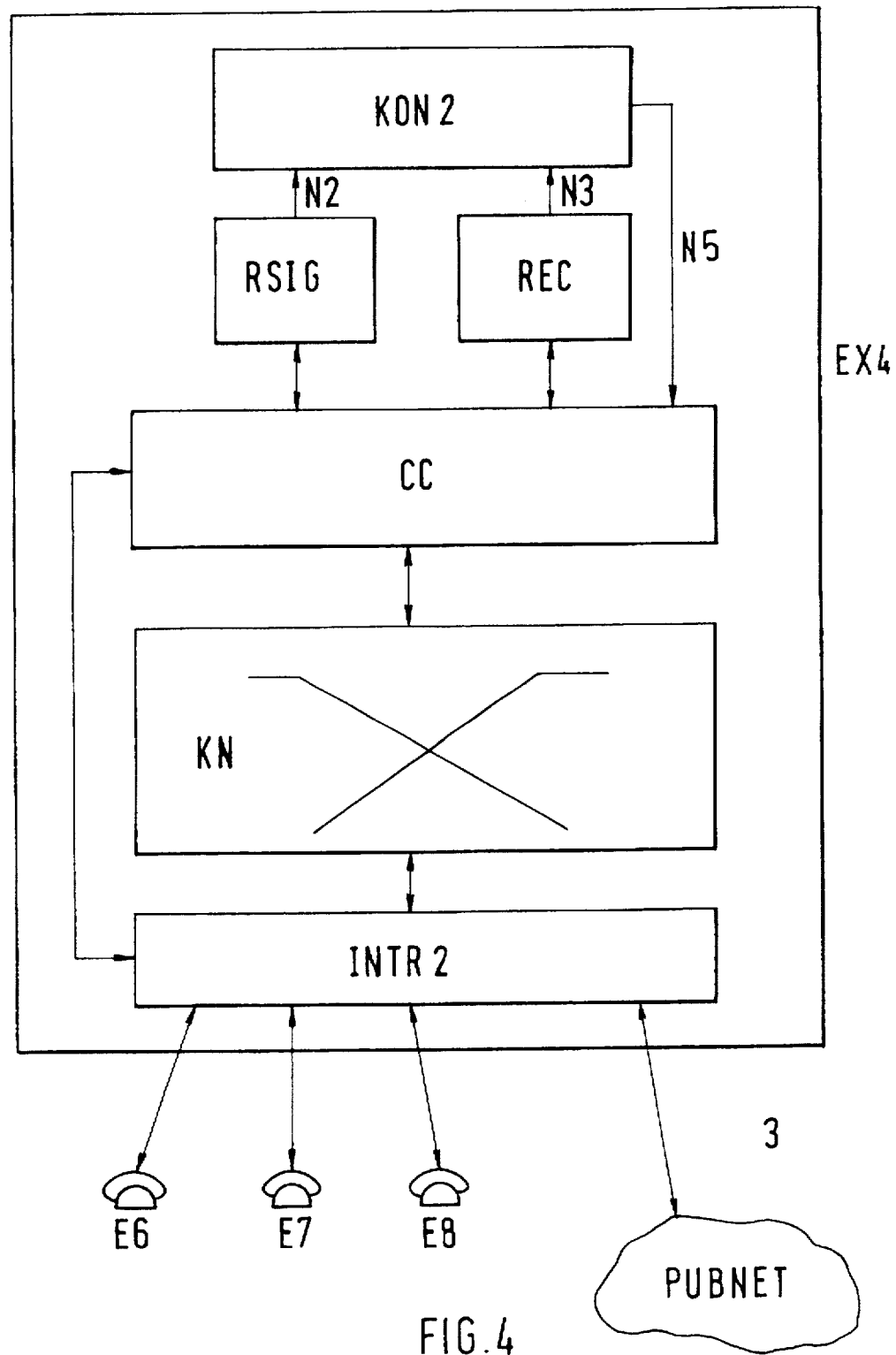
FIG. 4 is a block diagram of the switching facility of FIG. 1.

FIG. 4 shows the switching facility EX4. It contains a switching network KN, a call control CC, an interface device INTR2, a translating device KON2, a receiving device REC, and a call evaluator RSIG.

The interface device INTR2 is connected to the terminals E6 to E8 and, through the gateway GATE3, to the public network PUBNET. The switching network KN exchanges data with the interface device INTR2. The call control CC exchanges control and status information with the interface device INTR2 and the switching network KN. The call evaluator RSIG receives data from the call control CC and sends data to the translating device KON2. Similarly, the receiving device REC receives data from the call control CC and sends data to the translating device KON2. The call control CC receives data from the translating device KON2.

The call control CC controls the establishment and release of connections via the interface device INTR3 and the switching network KN. In addition, it is provided with a device which recognizes a call with an incomplete call number which comes from the public network PUBNET. This causes the call control CC to pass the call number contained in the call to the call evaluator RSIG. If messages are associated with this call, i.e., if, for example, a further number occupies the place intended for the ISDN subaddress, these messages will be passed on to the receiving device REC. If that is not the case, the translating device KON2 will receive no number from the receiving device REC, so that it cannot determine the subscriber to whom the call is directed. In that case, therefore, the call will not be processed by the call control CC. The call evaluator RSIG separates the call number, here the number N2, from the call and passes it to the translating device KON2. The receiving device REC receives the message associated with the call and generates the number therefrom, here the number N3.

The translating device KON2 receives the numbers N2 and N3, so that it has the number N4 again, i.e., the number for dialing directly to subscriber B. It then separates the subscriber number, here the number N5, from this number N4 and transfers it to the call control CC. The call control CC enters this number in the call at the place intended for the call number, and routes the call onward.

When the call has arrived at subscriber B, the connection between subscribers A and B will be established.

In the second embodiment, the use of the method according to the invention in a communication arrangement as shown in FIG. 1 will be described.

In this embodiment, the call number N3 of the subscriber is entered by subscriber A directly into the terminal E1 or is generated by the terminal E1, in a similar manner as by the service computer SCP of FIG. 3, from inputs by subscriber A. In the terminal, this call number is then divided into two numbers in a manner analogous to that in the service computer SCP of FIG. 3. Thereafter, a call request with the number N2 as call number is initiated, and the number N3 is sent to the switching facility EX4 as in FIG. 2 and as in the case of the service computer SCP of FIG. 3.

The third embodiment illustrates the use of the method according to the invention in a communication arrangement consisting of a public network and a private network for mobile subscribers.

The public network is constructed in the same manner as the public network PUBNET of FIG. 1. The operation of the associated service computer SCP is slightly different, so that the service computer will be denoted by SCP'. The private network consists of several wireless exchanges, in whose coverage areas a subscriber B' can be reached via his mobile terminal E6'. The establishment of a connection from subscriber A to subscriber B' will now be briefly explained with reference to FIG. 5.

Figure 5:
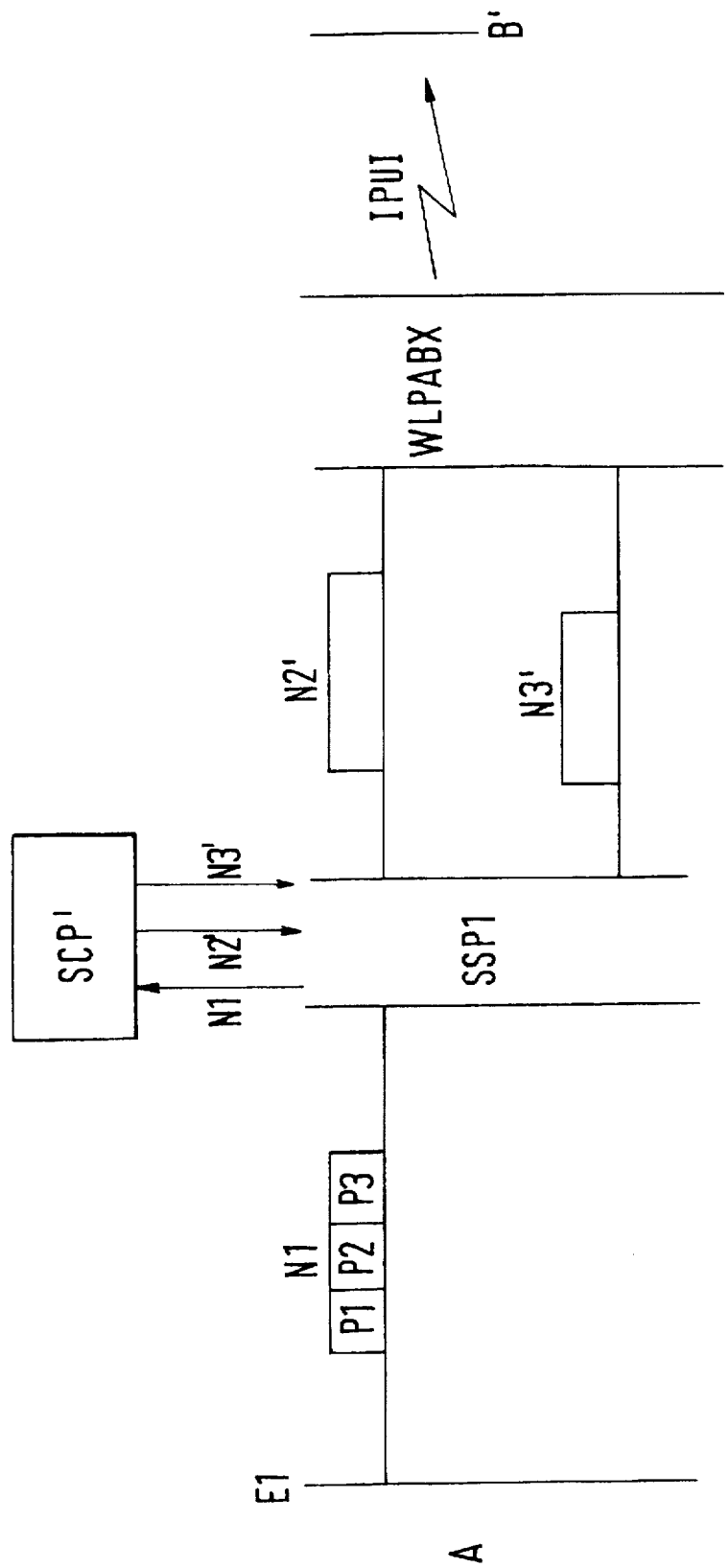
FIG. 5 is a flow chart illustrating the establishment of a connection by the method according to the invention for a second embodiment.

FIG. 5 show subscribers A and B', the terminals E1 and E6', the exchange SSP1, a wireless exchange WLPABX, the service computer SCP', three numbers N1, N2', and N3', and an identification IPUI.

As in FIG. 2, the call with the number N1 is routed to the exchange SSP1, and the number N1 is then transferred to the service computer SCP'. The service computer SCP' holds information on that wireless exchange in whose area the subscriber B' is located. The service computer SCP' now forms a call number of the subscriber, which is composed of the code of this wireless exchange, here the wireless exchange WLPABX, and a subscriber-specific identification, here the identification IPUI (=International Portable User Identity). It divides this call number into two numbers N2' and N3' and routes the call on to the wireless exchange WLPABX, as in FIG. 2. The wireless exchange WLPABX determines the identification IPUI of subscriber B' from the numbers N2' and N3', and pages him by sending out the identification IPUI. When subscriber B' has been found, the connection between subscribers A and B' will be set up.

I claim:

1. A method of establishing a connection to a subscriber (B; B'), characterized in that the method comprises the steps of:

during the establishment of the connection, transmitting a first part (N2, N2') of the call number (N4) assigned to the subscriber (B; B') from a first network (PUBNET)

to a second network (PRNET) by a method used to signal address information, and transmitting a second part (N3, N3') of the call number (N4) to the second network (PRNET) by a different method.

2. A method as claimed in claim 1, characterized in that a subscriber (A) of the first network (PUBNET) signals the first part (N2; N2') of the call number (N4) by the method used to signal address information, whereby the establishment of a connection to an exchange (EX1 to EX4; WLPABX) of the second network (PRNET) is initiated, a service sends the second part (N3; N3') of the call number (N4) to the exchange (EX1 to EX4; WLPABX) using the different method, and the exchange (EX1 to EX4; WLPABX) receives the second part (N3, N3') of the call number (N4), evaluates the second part (N3, N3'), and initiates the signaling for the further establishment of the connection to the subscriber (B; B').

3. A method as claimed in claim 1, characterized in that a request to establish a connection to the subscriber (B; B') is first directed to a service of the first network (PUBNET), which then generates a call number (N4) assigned to the subscriber and effects the signaling to route the call on to the subscriber (B; B'), the service signals a first part (N2; N2') of the call number (N4) by the method used to signal address information, whereby the establishment of a connection to an exchange (EX1 to EX4; WLPABX) of the second network (PRNET) is initiated, the service sends the second part (N3; N3') of the call number (N4) to the exchange (EX1 to EX4; WLPABX) by the different method, and the exchange (EX1 to EX4; WLPABX) receives the second part (N3; N3') of the number (N4), evaluates second part (N3; N3'), and initiates the signaling for the further establishment of the connection to the subscriber (B; B').

4. A method as claimed in claim 3, characterized in that the subscriber (B; B') is a subscriber of the second network (PRNET).

5. A method as claimed in claim 3, characterized in that the first network (PUBNET) is a public network, and the second network (PRNET) a private network.

6. A method as claimed in claim 3, characterized in that the first part (N2; N2') of the call number (N4) designates a gateway (GATE 1 to GATE 3) to the private network (PRNET), and that the second part (N3, N3') of the telephone number (N4) designates the subscriber (B; B') in the private network (PRNET).

7. A method as claimed in claim 3, characterized in that the second part (N3; N3') of the call number (N4), together with a portion of the first part (N2; N2') of the call number (N4), designates the subscriber (B; B') in the private network (PRNET).

8. A method as claimed in claim 3, characterized in that the service first decides on one of two or more gateways (GATE 1 to GATE3) to the second network (PBNET) and then generates the call number (N4) according to said gateway (GATE 1 to GATE 3).

9. A method as claimed in claim 3, characterized in that the second part (N3; N3') of the call number (N4) is sent over an information-carrying channel.

10. A method as claimed in claim 3, characterized in that ISDN signaling methods are used in the first network (PUBNET) and the second network (PRNET), and that the second part (N3; N3') of the call number (N4) is entered in the call request at the place intended for the ISDN subaddress.

11. A method as claimed in claim 3, characterized in that the service requests a calling subscriber (A) to send it further information about the called subscriber (B; B').

12. A method as claimed in claim 2, characterized in that the subscriber (B; B') is a subscriber of the second network (PRNET).

13. A method as claimed in claim 2, characterized in that the first network (PUBNET) is a public network, and the second network (PRNET) a private network.

14. A method as claimed in claim 2, characterized in that the first part (N2; N2') of the call number (N4) designates a gateway (GATE 1 to GATE 3) to the private network (PRNET), and that the second part (N3, N3') of the telephone number (N4) designates the subscriber (B; B') in the private network (PRNET).

15. A method as claimed in claim 2, characterized in that the second part (N3; N3') of the call number (N4), together with a portion of the first part (N2; N2') of the call number (N4), designates the subscriber (B; B') in the private network (PRNET).

16. A method as claimed in claim 2, characterized in that the second part (N3; N3') of the call number (N4) is sent over an information-carrying channel.

17. A method as claimed in claim 2, characterized in that ISDN signaling methods are used in the first network (PUBNET) and the second network (PRNET), and that the second part (N3; N3') of the call number (N4) is entered in the call request at the place intended for the ISDN subaddress.

18. A service computer (SCP) for connection to a first network (PUBNET) which is connected to at least one second network (PRNET) via at least one gateway (GATE 1 to GATE 3), and having an interface for communication with at least one switching facility (SSP1, SSP2; WLPABX) of the first network (PUBNET), characterized in that the service computer (SCP) comprises a translating device (KON1), a signaling device (SIG), and a sending device (SEND), the translating device (KON1) includes a device (CONTR) for generating a call number (N4) of a subscriber (B; B') from data contained in a call request directed to the service computer (SCP), and includes a device (DIV) for dividing said call number (N4) into a first part (N2; N2') and a second part (N3; N3'), the signaling device (SIG) initiates the signaling of the first part (N2; N2') of said call number (N4) by a method used to signal address information and the advancement of the call request, and the sending device (SEND) sends the second part (N3; N3') of the call number (N4) to a switching facility (EX1 to EX4; WLPABX) of the second network (PRNET) by a method different from that used to signal address information.

19. A switching facility (EX1 to EX4; WLPABX) for a second network (PRNET) having at least one gateway (GATE 1 to GATE 3) to a further, first network (PUBNET), the switching facility (EX1 to EX4; WLPABX) including a call control (CC), characterized in that the switching facility (EX1 to EX4; WLPABX) has a translating device (KON2) and a receiving device (REC) for receiving messages and for passing messages on to the translating device (KON2), the call control (CC) contains a device that recognizes an incomplete number of a call request from the first network (PUBNET), and transfers a message associated with the call request to the receiving device (REC), and that the translating device (KON2) generates a call number (N5) of a subscriber (B; B') by means of the message associated with the call request and causes the call control (CC) to route the call request on to the subscriber (B; B').

20. A terminal (E1) for connection of a subscriber (A) in a first network (PUBNET) to a subscriber (B,B') in a second network (PRNET), characterized in that the terminal (E1) includes a device that provides during the establishment of a connection to the subscriber (B; B'), a first part (N2; N2') of a call number (N4) assigned to the subscriber (B; B') from the first network (PUBNET) to the second network (PRNET) by a method used to signal address information, and that provides a second part (N3; N3') of the call number (N4) to the second network (PRNET) by a different method.

* * * * *